United States Patent Office 3,832,338
Patented Aug. 27, 1974

3,832,338
ORGOTEIN PRODUCTION USING A BUFFER SOLUTION CONTAINING DIVALENT METAL SALTS
Wolfgang Huber, San Francisco, and Thomas L. Schulte, Woodside, Calif., assignors to Diagnostic Data, Inc., Mountain View, Calif.
No Drawing. Continuation-in-part of application Ser. No. 237,507, Mar. 23, 1972, now Patent No. 3,758,682, which is a continuation-in-part of application Ser. No. 15,883, Mar. 2, 1970, which is a continuation-in-part of application Ser. No. 3,538, Jan. 16, 1970, which is a continuation-in-part of application Ser. No. 576,454, Aug. 31, 1966, which in turn is a continuation-in-part of application Ser. No. 494,048, Oct. 8, 1965, all now abandoned. This application Feb. 7, 1973, Ser. No. 330,401
The portion of the term of the patent subsequent to May 18, 1988, has been disclaimed
Int. Cl. A61k 17/00; C07g 7/04
U.S. Cl. 260—113                 10 Claims

ABSTRACT OF THE DISCLOSURE

The isolation of orgotein from an aqueous solution of a mixture of proteins comprising it is facilitated by conducting the isolation in an aqueous solution containing a divalent metal having an ionic strength of 0.60 to 1.00 A., preferably copper, zinc or both.

BACKGROUND OF THE INVENTION

This invention relates to a process for the isolation and purification of orgotein. This is a continuation-in-part of Application Ser. No. 237,507, now U.S. 3,758,682, filed Mar. 23, 1972 as a continuation-in-part of Application Ser. No. 3,538, now abandoned, filed Jan. 16, 1970, as a continuation-in-part of Application Ser. No. 15,883, now abandoned, filed Mar. 2, 1970, as a continuation-in-part of Application Ser. No. 576,454, filed Aug. 31, 1966, now abandoned, as a continuation-in-part of Application Ser. No. 494,048, filed Oct. 8, 1965, now abandoned.

Orgotein is the non-proprietary name assigned by the United States Adopted Name Council to members of a family of water-soluble protein congeners in substantially pure, injectable form, i.e., substantially free from other proteins which are admixed or associated therewith in the sources thereof. In lyophilized form these proteins are greenish-white powders soluble in water, saline, and buffer solutions and injectable without manifesting toxicity or the immunologic reactions typical of foreign-body proteins. Their elemental, infrared, ultraviolet, spectrographic, optical rotary dispersion and other analyses are consistent with their metalloprotein chelate structure. The novel pharmaceutical compositions of this invention are useful for ameliorating and mitigating in humans and other mammals as well as in other animals the adverse effects of inflammatory conditions, of stress conditions, including shock and toxemia, and of certain viral diseases as evidenced by pharmacological and clinical evaluation. See J.A.M.A., May 26, 1969, Vol. 208, No. 8; Huber et al. Abstracts Seventh Annual Meeting of the Society of Toxicology, Washington, D.C., March 1968; Carson et al., Federation Proceedings, 29, 420 [978] (1970).

The metalloproteins of the compositions of this invention are members of a family of protein congeners having a characteristic combination of physical, chemical, biological and pharmacodynamic properties. Each of these congeners is characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A. and which on gel electrophoresis gives a characteristic multiple-band pattern. Chemically, each is characterized by containing all but 0-2 of the protein aminoacids, a small percentage of carbohydrate, no lipids, 0.1 to 1.0% metal content provided by one to 5 gram atoms per mole of one or more chelated divalent metals having an ionic radius of 0.60 to 1.00 A., and substantially no chelated monovalent metals or those that are cell poisons in the molecule. Pharmacodynamically, each of the congeners is characterized by being a non-toxic, only weakly immunogenic injectable protein whose pharmacodynamic properties include anti-inflammatory activity. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced, for instance, in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

From recent literature data, it is now apparent that this family of metalloproteins includes the proteins previously isolated in various states of purity and given the names hemocuprein and hepatocuprein. Mann & Keilin, Proc. Royal. Soc. for Biol. Sci., *126*, 303 (1939); cerebrocuprein, Porter & Ainsworth, J. Neurochem., *1*, 260 (1957); erythrocuprein, Markowitz et al., J. Biol. Chem., *234*, 40 (1959); and cytocuprein, Carrico & Deutsch, J. Biol. Chem., *244*, 6087 (1969). For other references, see Mohamed & Greenberg, J. Gen. Physiol. *37*, 433 (1954); Porter & Folch, Arch. Neurol. Psychiat. *77*, 8 (1957); Porter & Ainsworth, J. Neurochem., *5*, 91 (1959); Krimmel et al., J. Biol. Chem., *234*, 46 (1959); Wyman, Biochem. Biophys. Acta, *45*, 387 (1960); Shields et al., J. Clin. Inv., *40*, 2007 (1961); Markowitz et al., Anal. Chem., *33*, 1594 (1961); Porter et al., Arch. Biochem. Bioph., *105*, 319 (1964); Stansell & Deutsch, J. Biol. Chem., *240*, 4299 (1965); ibid, *240*, 4306 (1965); Stansell & Deutsch, Clin. Chem. Acta, *14*, 598 (1966); McCord & Fridovich, J. Biol. Chem., *248*, 5753 (1968); Hartz & Deutsch, J. Biol. Chem., *244*, 4565 (1969); McCord & Fridovich, J. Biol. Chem., *248*, 6056 (1968); Carrico & Deutsch, ibid, *245*, 723 (1970. These metalloproteins have reported to possess very high superoxide dismutase activity. See McCord & Fridovich, J. Biol. Chem., *244*, 6049 (1969); Keele, McCord and Fridovich, J. Biol. Chem., *245*, 6176 (1970); ibid, *245*, 2875 (1971).

Orgotein is at least partially in the form of a metal chelate, i.e., it contains from 1 to 5, preferably about 4, gram atoms per mole of protein (GAPM) of one or more chelated divalent metals having an ionic radius of 0.60 to 1.00 A. Preferably, the predominant metal is one having an ionic radius of 0.65 to 0.79 A., i.e., Co, Cu, Fe, Ge, Mg, Ni and Zn, more preferably Cu or Zn. Above 4 GAPM, at least a portion of the metal content of the protein appears not to be in chelated form and is not required for the physiological activity of the protein to be manifested at its maximum. The total metal content of most samples is about 0.1 to 1% and in the most active samples, it is between 0.15 and 0.75%. The degree of pharmacological activity possessed by orgotein appears to be at least partially dependent upon the presence of one or more physiologically essential divalent metal ions in the chelate. Therefore, preferably at least 65%, desirably at least 75%, and most preferably 85% or more of the metal content of the chelate is provided by a combination of one or more of Ca, Cu, Fe, Mg, Co and Zn in divalent form, more preferably two or more of Cu, Mg, Co and Zn. For a list of ionic radii of metals, see Hall, "Chemistry and Physics," 44th Ed. pages 3507-8 (1962). In most of such samples, a metal having an ionic radius of 0.65 to 0.79 A., preferably Cu, Mg or Zn is the predominant metal. By "predominant metal" is meant the chelating metal present in highest percentage in the protein chelate. Most orgotein congeners are isolated containing about 2 GAPM each of Cu and Zn.

For a further description of orgotein, see the disclosure of S.N. 237,507 and the applications cited above parent thereto, which disclosure is incorporated by reference. See also Netherlands Pat. 66/14,177, Belgium Pat. 687,828 and British Pat. 1,160,151.

As is typical of processes for the isolation and/or purification of a protein, orgotein is isolated and/or purified by one or more steps in which an aqueous solution of a mixture of proteins comprising or consisting essentially of orgotein is fractionated to yield a fraction enriched in orgotein. Such fractionation steps typically employ one or more of organic solvent or soluble salt fractionation and column chromatography.

In the earliest of the prior filed parent applications cited above, orgotein is isolated in a multi-step process employing both organic solvent and ammonium sulfate fractional precipitation, selective heat denaturation and molecular sieve chromatography or gel electrophoresis. See also 3,687,927. 3,579,495 claims a process for the isolation of lysed red blood cells. 3,624,251 claims a post-heat treatment purification of substantially pure orgotein. All of these processes involve the fractionation of an aqueous solution of a mixture of proteins comprising orgotein, in an amount from as low as a few parts per million to substantially pure orgotein, to yield a protein fraction enriched in orgotein.

SUMMARY OF THE INVENTION

The process of this invention is an improvement in processes for the production of orgotein which comprise at least one step of fractionating an aqueous solution of a mixture of proteins comprising orgotein to yield a fraction richer in orgotein than the starting mixture of proteins, which improvement comprises conducting the fractionation step with a buffer solution containing dissolved therein at least one salt of a divalent metal having an ionic radius of 0.60 to 1.00 A.

DETAILED DISCUSSION

In its preferred aspects, the process of this invention comprises one or more of the following:

(a) The fractionation is conducted in a plurality of steps;

(b) The fractionation comprises a heating step in which extraneous proteins are insolubilized;

(c) The divalent metal has an ionic radius of from 0.65 to 0.79 A.;

(d) The buffer solution contains dissolved therein a $Cu^{++}$ salt; and (e) The buffer solution contains dissolved therein a $Zn^{++}$ salt.

The isolation of orgotein from mixtures of proteins comprising it and/or the purification of isolated orgotein is usually conducted in a buffer solution thereof. Typically, one or more fractionation steps are conducted in which a portion of the proteins of a mixture of buffer soluble proteins comprising orgotein is separated therefrom, e.g., by precipitation, using heat, solvent or ammonium sulfate or other soluble salt; by column chromatography, e.g., using diethylaminoethylcellulose or other weakly basic ion exchange resin.

According to the process of this invention, such fractionation steps are conducted in the presence of a divalent metal ion having an ionic radius of 0.60 to 1.00 A., preferably 0.65 to 0.80 A., more preferably 0.65 to 0.79 A. These ions can be provided by conducting the fractionation employing an aqueous solution having dissolved therein a salt of the selected metal ion, e.g., $Mg(OOCCH_3)_2$, $MgSO_4$, $MgCl_2$, $CaCl_2$, $MnSO_4$, $Cu(OOCCH_3)_2$, $Zn(OOCCH_3)_2$, $ZnSO_4$, etc., in at least $1 \times 10^{-4}$ M concentration, preferably 0.005 to 0.20 M, e.g., about 0.20 M, when the metal is Mg or Mn. The concentration which should be used is dependent upon the divalent metal used. Magnesium, manganese, calcium and cobalt keep the protein in solution above about 0.2 M or below about 0.02 M concentration of the metal. Zinc and copper bring about precipitation at 0.2 M. Therefore, these should be used at lower concentration than the other metals, e.g., about $5 \times 10^{-4}$ M for copper and $55 \times 10^{-5}$ M for zinc. Thus, the upper limit of salt concentration is that which salts out the orgotein, the lower limit being that at which no significant protection is afforded the orgotein protein against loss of chelated metal.

To achieve substantial protection, the selected salt or salts of divalent metals should be present at a total concentration of about 24 to 40 or more gram atoms per mole (GAPM) of orgotein. Thus, if natural orgotein, which contains 2 GAPM each of chelated $Cu^{++}$ and $Zn^{++}$ in the molecule (about 0.4% by weight) is to be protected according to the process of this invention, the concentration of each metal should be 12–20 or more GAPM of orgotein. In terms of concentration, this means that the aqueous solution employed in any fractionation of a mixture of proteins comprising orgotein at usual concentrations should contain about 2.4 to 4.0% of each of $Cu^{++}$ and $Zn^{++}$ based on the orgotein present, to ensure maximum protection against loss of these metals from the orgotein molecule and resultant loss of molecular conformation. Proportionately higher or lower amounts of other divalent metals of higher or lower atomic weight will be required.

In U.S. 3,579,495, there is claimed an improvement in the process of this invention in which a heating step is conducted in a buffer solution containing as the sole divalent metal ions, a mixture of $Mg^{++}$, $Cu^{++}$ and $Zn^{++}$ ions, in concentrations of $10^{-3}$ M, $10^{-4}$ M and $10^{-5}$ M, respectively.

Orgotein usually occurs as a mixed $Cu^{++}$, $Zn^{++}$ chelate containing about 2 gram atoms per mole (GAPM) of each metal. Therefore, in its preferred aspect, the process of this invention is preferably conducted in a buffer solution containing dissolved therein a salt of one or both of these divalent metals. However, salts of other divalent metals having an ionic radius of 0.60 to 1.00 A. are also effective in improving the isolation of orgotein. For example, a soluble salt of manganese is more effective than of other divalent metals in facilitating the extraction of orgotein from liver.

As stated above, orgotein ordinarily exists as a copper-zinc mixed chelate. If a chelate is desired containing another divalent chelating metal having an ionic radius of 0.60 to 1.00 A. in addition to or in substitution of one or more of these metals, such a chelate can be produced by transchelating a chelate whose predominant metal is one having an ionic radius of 0.65 to 0.79 A. or chelation of the apoprotein.

Transchelation techniques known in the art can be used, if appropriately modified to take into consideration the properties of orgotein, e.g., by dissolving orgotein in a buffer solution containing a water soluble salt of a divalent metal having an ionic radius of 0.65 to 0.79 A., with the ratio of metal ion to protein being such as to retain the protein in the selected buffer solution as a metal chelate of such metal. The choice of conditions is limited by the labile character of the orgotein protein in the absence of chelating metals and at pH below 1 or above 11.

In addition to certain pH, the orgotein protein is sensitive to heat, the degree of sensitivity depending in part upon its degree of purity and concentration. When very impure, e.g., in the form of a lyophilized mixture of all the soluble proteins from a natural source, the orgotein is reasonably stable. The pure orgotein protein, in its metal chelated form of this invention, is also stable, so that less care is required in handling and storing pure orgotein than substantially pure orgotein.

In Application S.N. 291,320, filed Sept. 22, 1972, there is claimed an improved process for the isolation of orgotein from red blood cells in which at least the red blood cell portion of whole blood is heated at 60–80° C. to precipitate both the hemoglobin and carbonic anhydrase. In Application Ser. No. 273,278, filed July 19, 1972, there is claimed the enzymatic removal of extraneous proteins from mixtures comprising orgotein. In these processes, as in the processes of Applications Ser. No. 205,609 and 205,610, now U.S. 3,763,136 and 3,763,137, and U.S. Pats. 3,579,495 and 3,624,251, the fractionation steps are preferably conducted in an aqueous solution containing a salt of a divalent metal having an ionic radius from 0.60 to 1.00 A.

As stated above, the orgotein protein is sensitive to pH. Denaturation occurs at pH below 1.0 and above 13. Therefore, solutions of the protein should be maintained at a pH from 4–10 to avoid reduced yields by partial denaturation. The degree of solubility or insolubility under any given set of conditions is also dependent on the degree of purity and the concentration of the desired protein.

Preferably the pH of the solution containing the divalent metal ions is non-acidic, e.g., pH 7.0 to 8.5. When the fractionation step involves precipitation of less soluble proteins while retaining the orgotein in solution, the pH is preferably about 7–8.5. When the orgotein protein is precipitated, the pH is preferably about 4–7.5, e.g., about 5.0.

Buffers which can be used include any conventional buffered aqueous solvent solution for proteins which provide the requisite pH, e.g., $NH_4H_2PO_4$—$(NH_4)_2HPO_4$, tris(hydroxymethyl)aminomethane, maleic acid-NaOH, citric acid-sodium citrate, acetic acid-sodium acetate, citric acid-$(NH_4)_2HPO_4$, succinic acid-NaOH, sodium acid maleate-NaOH, sodium cacodylate-HCl, boric acid-borax, etc. See G. Gomori, "Methods in Enzymology," Vol. I, pages 138–146 (1955), especially buffers No. 5–8 and 10–18. Water adjusted to weakly alkaline pH and containing sufficient divalent metal ion can also be used.

As stated above, the desired protein is much more stable, particularly to heat, as a chelate of a divalent metal ($Me^{++}$) having an ionic radius of 0.60 to 1.00 A. It rapidly loses its stabilized compact configuration in the absence of adequate amounts of such chelating metals. Therefore, it is especially desirable that any heat purification step be conducted with the process of this invention.

Starting Materials

A wide variety of natural protein sources contain trace amounts of the precursor natural form of orgotein. Such sources include animal organs and tissue, e.g., liver, kidney, testes, pancreas, placenta, intestinal mucosa, thymus, lung, spleen and red blood cells of the rabbit, sheep, lamb, mules, horses, chickens, rats, monkeys, goat, guinea pig, dog, cat, swine, cows, steers, calves, humans, marine organisms, e.g., whale, dolphin, sea lion, shark, swordfish, mussels, lobsters and oysters, vegetable sources rich in protein, e.g., seeds, wheat germ, whole rye, soya, kidney, lima and jackbeans, and mushrooms; also micro-organisms, e.g., fungi and bacteria, including yeasts, E. Coli, Streptomyces, penicillium and Saccharomyces. Preferred sources are animal organs and red blood cells (RBC), preferably bovine.

The orgotein precursor is often extracted from the natural protein source along with proteins having enzyme activity, e.g., arginase and carbonic anhydrase, etc. However, except for superoxide dismutase activity possessed by the Cu chelated congener, which is as high as any reported in the scientific literature, orgotein itself does not exhibit generalized enzyme activity. Tests in over 30 different enzyme systems, utilizing a broad range of substrates, have failed to reveal any significant activity when the protein was used in lieu of the enzyme in the respective assay systems. Included were several each of the oxidoreductases, transferases, hydrolases, proteases, lipases and isomerases. Only in the case of catalase, peroxidase and snake venom phosphodiesterase were traces of activity observed, i.e., less than 2% of that of the respective known enzymes run in parallel.

Known techniques for isolating such enzyme-containing fractions can be employed for obtaining a starting protein-fraction containing enriched amounts of the orgotein precursor if the isolation technique employs a freshly harvested source of protein and otherwise meets the requirements for non-destruction of the desired protein. See R. M. Morton in "Methods in Enzymology," Colowick and Kaplan Editors, Vol. I, pp. 25–51, Academic Press, New York (1955).

To determine whether a mixture of soluble proteins contains protein precursors of orgotein, a divalent metal having an ionic radius of 0.60 to 1.00 A. is added to a solution of the proteins and enough protein impurities are removed to permit the characteristic multi-band pattern typical for the orgotein protein in gel electrophoresis at low ionic strength to be detected among the other proteins present. To do so, the mixture of proteins to be assayed for orgotein protein content is dissolved at 0–5° C. in a buffer at pH between 1 and 13, e.g., 4–10, preferably about 7.5, which contains dissolved therein a salt of one or more divalent metals. Any buffer-insoluble proteins are removed, e.g., by filtration or centrifugation. The buffer-soluble proteins are then precipitated therefrom with a water-miscible solvent, e.g., acetone. The buffer soluble portion of the precipitated proteins will reveal on gel electrophoresis on polyacrylamide or agarose at low ionic strength, within its overall pattern the narrow, closely spaced multi-band pattern typical of orgotein. The details for running such electropherograms have been described above.

Thin film argarose electropherograms are particularly useful to follow the enrichment of the orgotein protein in the protein mixture. Sample concentrations of 1.0–100 mg./ml., run in 0.17 M tris-glycine buffer at pH 8.45, 5 ma. and 200–300 v. for 30 minutes have proved useful for this purpose. An advantage over disc gel electrophoresis as an analytical tool is their ability to visualize both cathodically and anodically moving proteins as a result of the sample well being near the center of the plate.

Orgotein Isolation Procedure

A typical isolation technique employing the process of this invention to obtain isolated substantially pure orgotein from animal organs or tissue first removes insoluble materials, using an aqueous solution as a selective solvent for the soluble proteins containing the desired protein. Then materials more soluble than the desired protein are removed employing one or more organic solvent and/or salt precipitation steps in which a fraction of the proteins containing the orgotein is precipitated and the more soluble material is retained in the supernatant. Thereafter, undesired thermolabile soluble proteins are insolubilized by a brief heating step which selectively denatures such proteins. Preparative electrophoresis, preferably gel electrophoresis, or gel filtration can be used to remove residual undesirable, soluble proteins such as, for instance, albumin, thereby providing an injectable protein product free of impurity-induced side reactions.

To isolate the proteins comprising orgotein from natural sources, any gross particles of non-proteinaceous and fibrous insoluble proteinaceous material from a freshly harvested source of protein can be removed in a conventional manner. As soon as possible, the freshly harvested material should be chilled and kept chilled except as indicated herein. A temperature below 10° C. is desirable, preferably below 5° C., e.g., as close as practicable to the freezing point of the aqueous solutions used in the isolation steps.

The first step in isolating orgotein from a protein source thereof by the removal of insoluble proteins from a tissue source can be achieved by intimately mixing the finely divided protein mixture with an aqueous solution, preferably a buffer solution, of a pH of 4–12, preferably about neutrality.

After separating the insoluble proteins from the buffer solution of the soluble proteins, e.g., by filtration or centrifugation, separation of the undesired soluble proteins and any remaining non-proteins can be accomplished at least in part, by selective precipitation. Much of the undesired highly soluble and less soluble proteins can be removed from the protein mixture by step-wise selective precipitation of the proteins in the mixture from a buffer solution thereof, using organic or inorganic materials soluble in or miscible with, the buffer solution. For example, lipids, nucleic acids, nucleotides and other extraneous materials can be separated by adding sufficient cold acetone or other water miscible organic solvent to the buffer solution of the soluble proteins. Lipids and other acetone soluble impurities remain in solution. Most or all of the proteins, including the orgotein protein, are precipitated. On extraction of the precipitate with appropriate, buffer, the orgotein protein is dissolved while many of the other undesired materials remain insoluble.

Any pigmentaceous material in the buffer solution ought also be removed. This can be accomplished by adding a water-soluble amine, preferably heterocyclic, e.g., pyridine, piperidine, or other water-miscible organic solvent or solvent mixture in which the pigmentaceous material is insoluble, to a solution of the proteins in a buffer solution, e.g., before the precipitation of proteins less soluble than the orgotein protein. Removal of the undesired less soluble proteins can follow, if desired, the separation of the precipitated pigmentaceous materials, by adding an inorganic salt or sufficient additional organic solvent to selectively precipitate some proteinaceous material, leaving the desired protein and the more soluble, undesired proteins and any other extraneous very soluble material in the supernatant. For example, the pigment-free buffer solution of the soluble proteins initially can be brought to 40–55% of saturation with ammonium sulfate or other organic or inorganic salt or by use of organic solvent at a concentration which reduces the solubility of the protein mixture in the buffer, thereby selectively precipitating much of the undesired less soluble protein, which can be discarded. Organic materials which can be used to selectively precipitate undesired proteins include water miscible polar solvents, e.g., lower aliphatic alcohols, such as ethanol and isopropyl alcohol, and acetone, dioxane and tetrahydrofuran. For example, a mixture of chloroform and ethanol can be used to precipitate the pigmentaceous material and then, after removing that precipitate, more ethanol is added until protein precipitation begins to occur. If desired, the chloroform can first be removed under vacuum. Other organic solvents, e.g., the lower-aliphatic alcohols, acetone, dioxane, tetrahydrofuran, can be used in this step.

Orgotein can be selectively precipitated from the buffer solution, leaving more soluble materials therein, by adding additional salt or solvent thereto in the manner described for the removal of the less soluble proteins.

The selectivitiy and efficiency of these salt and solvent fractionation precipitations of protein mixtures comprising orgotein are affected by the pH of the buffer solution, which should be maintained between 1 and 12, preferably about 4–10, as well as by the ionic strength and the technique of addition.

An important step in the above-described fractionation process is a heating step in which the proteins more heat labile than orgotein are denatured. This step is preferably conducted after buffer insoluble proteins and non-proteins, pigmentaceous material and organic solvent/water soluble components have been removed. It is important this step takes place with the orgotein protein in the form of a divalent metal chelate. Therefore, the heat treatment ought be conducted in a buffer solution of the protein mixture containing from $1 \times 10^{-5}$ to $2 \times 10^{-1}$ M or more, depending upon the metals used, of the ions of divalent metal having an ionic radius of 0.60 to 1.00 A.

In such a heating step, a buffer solution of the mixture of proteins containing the orgotein protein is heated at about 50–75° C. for a period of time from a few seconds up to about 45 minutes, depending on the selected temperature.

The time and temperature employed in the heat treatment are inversely proportional. At this point in the purification process, the desired protein is only briefly stable at temperatures above 75° C. Therefore, unless an instantaneous heating and chilling technique like flash pasteurization is employed, the mixture should not be heated above 75° C. Heating to temperatures below 50° C. usually is not satisfactory because some of the undesired heat labile proteins are fairly resistant to denaturation at such lower temperatures. At this point in the purification process, the desired protein is stable at 55° C. for at least 15–30 minutes, at 60° C. for about 10–25 minutes and at 65° C. for about 10–15 minutes, thus permitting the use of conventional heating and cooling techniques. Therefore, heating at about 55° C. for about one hour to about 70° C. for a few minutes, preferably about 60 to 65° C. for about 10 to 20 minutes, is usually employed.

The amount of orgotein lost in the heating step is partially dependent upon the amount of protein impurities which are denatured and the orgotein concentration. However, the heating step can be conducted on a protein mixture in which none, some, or substantially all of the protein impurities have been previously removed by other techniques.

In the final purification any significant remaining amounts of extraneous proteins are removed to produce the isolated substantially pure orgotein. Because the remaining proteins other than albumin type are less apt to produce desirable responses upon injection, their virtually complete removal is less critical but nonetheless much preferred. Remaining extraneous proteins can be removed in a variety of ways, e.g., countercurrent extraction, gel filtration, paper or thin layer chromatography, or selective elution from apatite and other inorganic gels or ion exchange columns either singly or in combination. Gel electrophoresis or resin chromatography using a porous resin which acts as a molecular sieve, e.g., crosslinked dextran, is preferred. Resin chromatography is most preferred for reasons of production economy and because larger amounts of protein can be processed at one time.

An albumin removal step is essential, when the protein source contains albumin, because the other isolation steps usually employed in a process for producing the desired protein product increase rather than decrease the absolute albumin content of the purified protein. For example, the albumin content of the total soluble protein fraction from bovine liver is 7.5%; bovine kidney, 8%; from porcine kidney, 10%; fron bovine spleen, oysters and mussels, 2–3%. In the fractionation steps described hereinafter, albumin content of the concentrates rises to 22–31%. Gel electrophoresis or resin chromatography is effective in reducing the albumin content of these concentrates to below 1%.

Thus, concentration without electrophoresis or resin chromatography of a protein source containing significant amounts of albumin causes a build-up of albumin which precludes its safe use as an injectable pharmaceutical agent and prevents it from manifesting useful pharmacological activity. Free-falling curtain electrophoresis is capable of removing much of this albumin. Gel electrophoresis and resin chromatography remove even more. An albumin removal step is not, of course, required when albumin-free starting material, such as red blood cells from many species, is used.

A commercially available electrophoresis unit which can be used for free-falling curtain electrophoresis is the Brinkmann Model FF. The separating chamber in one such unit for instance is 50 centimeters square and 0.5 to 1 mm. in depth. The temperature is maintained as close to 5° C. as possible. The unit permits the collection of up to 48 fractions. In operation, the protein, dissolved in trismaleate-$Me^{++}$ buffer, pH 7.6, is applied continuously. Currents of about 1,000 volts and 10–20 ma. are used. With properly pre-purified protein mixtures, the desired protein chelate will be found in fractions 10–26 which are pooled, dialyzed and lyophilized. The construction and the operating characteristic of this unit limit its capacity to about 500 mg. runs. The isolated protein is obtained in batches of about 100 mgs. which are subsequently pooled. Using this method, albumin levels can be lowered to about 5–10%. However, levels below 5% are not ordinarily achieved.

A more effective purification technique is the gel or "zone" electrophoretic purification described herein which uses a gel supporting medium, e.g., polyacrylamide, agarose, starch, etc. Substantially complete removal of albumin and other extraneous proteins can be achieved by this technique, by virtue of their different speeds of migration.

The preferred preparative gel electrophoresis media is polyacrylamide (5 to 10%). Cellulose, cross-linked dextran (Sephadex, Pharmacia, Upsala, Sweden) and starch modifications (ethanolized, etc.), agar, sucrose-agar and other agar modifications are satisfactory but have the disadvantage of their gels being more fragile. For a description of the principles of gel or "zone" electrophoresis, see "Gel Electrophoresis," J. F. Frederick, Editor, Annals N.Y. Academy Sci., *121*, 305–650 (1964).

A production model developed for disc gel electrophoresis purification has a 5 to 7% polyacrylamide block 32 centimeters long, 10 centimeters wide and one centimeter deep held between jacketed top and bottom plates made from clear plastic. The dimensions of the block are such that cooling is very efficient and the small depth assures rapid temperature equilibrium between center and surfaces. Cooling is provided by a refrigerated circulating system employing ethylene glycol-water. Operation is carried out at 600–1000 volts and 200–500 ma. These currents together with the very efficient cooling make it possible to handle 1–5 g. quantities of starting protein during a developing process of 2–10 hours. The material is applied to a starting trough as a highly concentrated solution in tris-maleate-$Me^{++}$ or similar buffer at pH 7.4. At appropriate times of development, buffer is passed through the gel at right angles to the direction of electrophoretic flow to elute the protein. Location of protein bands, completeness of elution and protein concentration in eluted fractions are determined by spectroscopy at 280 m$\mu$, or by staining of indicator sections.

In gel electrophoresis, beef liver orgotein is found between slow-moving, gamma globulin protein type fractions and the fast-moving, albumin-type protein fractions.

Another preferred means for removing albumin and other types of extraneous proteins remaining after the previously described fractionation steps is by chromatography, e.g., using as chromatographing media "porous" resins which "filter" proteins according to molecular volume, i.e., act as molecular sieves. One such resin is Sephadex (Pharmacia, Upsala, Sweden) a cross-linked dextran resin of defined pore size. The partially purified orgotein in a buffer-$Me^{++}$ solution, is deposited in highly concentrated form on a column of the resin and then eluted in the manner conventional for chromatographic columns, but using a buffer solution containing a divalent metal of ionic radius of 0.60 to 1.00 A., preferably 0.65 to 0.79 A., e.g., magnesium, or a mixture of two or more of magnesium, copper and zinc, as eluting solvent. Ionic strength variations often facilitate separation and subsequent elution.

In U.S. 3,579,495, there is disclosed a process for isolating orgotein from red blood cells. According to that process, the red cells are separated from the plasma of the blood by centrifuging. Repeated washing of the separated cells with isotonic solvents and re-centrifuging removes residual plasma and with it the plasma albumin, adhering to the compacted cells. The plasma-free red cells are then ruptured by hemolysis, using conventional procedures. See M. Moskowitz and M. Calvin, Exp. Cell Res., *3*, 33 (1952); S. S. Bernstein et al., J. Biol. Chem., *122*, 507 (1938). Hemolysis with deionized water and sonification at 0–5° C. is preferred.

The hemoglobin and stroma are separated from the lysed mixture by methods known in the art. See E. R. Waygood, Methods in Enzymology, Vol. 2, 836 (1955), Academic Press. Preferably, for hemoglobin this is accomplished by adding a halogenated aliphatic solvent which apparently forms an insoluble complex with the hemoglobin, along with a water-miscible organic solvent to bring a small proportion of the immiscible solvent into the aqueous phase. Hemoglobin complex and stroma then can be removed by centrifugation.

The supernatant, now substantially free of hemoglobin and stroma, is then freed of carbonic anhydrase and other enzymes by heating the supernatant in the manner described in U.S. 3,579,495 and Example 4 herein, until the carbonic anhydrase has been inactivated by heating, i.e., 10–30 minutes at 60–70° C. Thereafter the mixture is immediately cooled to well below room temperature. The precipitated proteins are removed by filtration or centrifugation. The supernatant remaining after removal of the precipitated proteins contains the orgotein protein as the, or one of the, predominate proteins. After removal of the precipitate formed in the heating step, the orgotein protein in the resulting solution, or isolated therefrom by dialysis and lyophilization, can be purified and isolated by mixed bed resin filtration, electrophoresis and/or gel filtration through a polymer which acts as a molecular sieve, as described herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The following is a general procedure for isolating proteins from natural sources thereof to provide a suitable starting proteinaceous material for the process of this invention.

Mechanically remove as much extraneous material as possible from a freshly harvested, washed and cleaned plant or animal source of protein. In the case of animal tissue, glands and organs, remove fat, connective tissue and blood vessels. Conduct all subsequent steps below 5° C., except as indicated.

(a) Toluene Method

Homogenize the protein source and immediately add 3 vol. of deionized water or a suitable buffer, 0.05–0.30 M, e.g., maleate, phosphate, tris-maleate, barbital, tris-hydroxymethyl-aminomethane, borate, cacodylate, glycine-sodium hydroxide, etc., containing $1 \times 10^{-4}$ to $2 \times 10^{-1}$ M of a water soluble salt, e.g., chloride, sulfate, phosphate, acetate, citrate, maleate, borate or phosphate, etc., of a physiologically essentially divalent metal, e.g., calcium, cobalt, copper, iron, magnesium, manganese or zinc. Adjust to pH 7.0–7.8. Stir the resulting mixture for several hours. Then add slowly 0.01 vol.-equivalent of toluene and continue stirring for several more hours. Let sit until the supernatant is reasonably clear. Filter, e.g., through cloth, cotton, glass wool or filter-aid, or cntrifuge. Exclude direct light in these operations. Immediately freeze the filtrate and lyophilize it. If direct lyophilization proves difficult, dialyze first against 0.001 M buffer containing $0.1–5 \times 10^{-4}$ M bivalent metal salt, e.g., $Ca^{++}$, $Co^{++}$, $Cu^{++}$, $Fe^{++}$, $Mg^{++}$, $Mn^{++}$, $Zn^{++}$. The resulting powder can be stored in the cold, preferably at below 0° C.

(b) Acetone Powder Method

Suspend finely disintegrated whole tissue in any of the buffer—$Me^{++}$ mixtures of (a) above, bring to pH 7.0–7.8 and cool the dispersion to 0°. Add to the dispersion very slowly 10 vols. of acetone at —10° C. with rapid mechanical stirring. Let settle for about 10 minutes, and decant the supernatant aqueous acetone. Collect the precipitate either by centrifuging or by vacuum filtration through a No. 1 Whatman paper on a wide Buchner funnel in a cold room at 0°. Wash the precipitate twice by suspending on each occasion in about 3 vol. (Calculated from the original volume of dispersion) of acetone at —10° C. Remove the acetone from the precipitate, first using a stream of nitrogen followed by drying the powder in vacuo over $H_2SO_4$. The last acetone treatment can be followed by washing with dry peroxide-free diethyl ether (at —15°), which greatly facilitates rapid drying. Store the dried material in the cold, preferably in vacuo over a drying agent.

Alternatively, disintegrate the whole tissue directly in 10 vol. of acetone at —15° in a Waring Blendor (for 3 minutes), and retreat the precipitate with acetone as described above.

If the first acetone precipitate contains much lipid material, washing it with n-butanol at —15° greatly improves the subsequent extractions.

Alternatively, cut 1 kg. of fresh bovine liver, free from connective tissue, into five or six pieces, rinse with tap water and mince. Homogenize portions of mince (200 g.) in a Waring Blendor with 200 ml. cold iso-osmotic KCl solution for 20 sec. Immediately mix the homogenate in the blendor with 200 ml. of acetone at —10° for another 20 sec. Pour the acetone-treated hemogenate with stirring into a 10 liter beaker containing 2.5 liters of acetone at —10°. When the final portion of mince has been treated, add to the contents of the beaker cold acetone to a volume of 10 liters and mix. Hold at 4° for a few minutes. Decant the clear supernatant and again mix the contents of the beaker with acetone to 10 liters. Decant the clear supernatant and filter the suspension rapidly on a Buchner funnel covered with a sheet to exclude as much air as possible. Before the cake on the funnel is completely dry, wash with 2 liters of cold acetone.

Continue the filtration until the particles are completely dry. Break up the solid material, spread out on filter paper and air-dry, preferably under a cover of nitrogen. Finely grind the powder while cold and store in vacuo at 4°. The yield is about 250 g. of powder.

EXAMPLE 2

The following is a general procedure for producing and isolating orgotein from protein sources of the type produced in the above-described Preparation 1.

All operations are carried out in 0.1 M tris-maleate-$Me^{++}$ buffer at pH 7.4, unless otherwise indicated. 0.05 M to 0.2 M tris-phosphate-$Me^{++}$, tris-succinate-$Me^{++}$, trisglycine-$Me^{++}$ and tris-HCl-$Me^{++}$ buffers work equally well. All operations involving organic solvents are carried out at 0 to 2° C., or lower using organic solvents pre-cooled to —10° C. All other operations are at temperatures below +5° C., except as indicated.

A. Removal of Buffer-Insoluble Material

In the cold and in the absence of direct light, stir 100 g. of dry powder, obtained according to Preparation 1, into one liter of tris-maleate buffer. After several minutes add 6.5 g. $MgSO_4 7H_2O$ in portions and adjust pH to 7.4 with 1N sodium hydroxide. Then add an additional 600 ml. of tris-maleate buffer and an additional 6.5 g. $MgSO_4 7H_2O$. Re-adjust to pH 7.4. Then add an additional 400 ml. water and continue stirring in cold room until about 6 hours have elapsed from the start of the operation. Let the mixture settle and then filter or centrifuge. Adjust the filtrate to pH 7.8, hold in the cold until precipitation is complete, centrifuge and filter supernatant. For storage, lyophilize the filtrate as described in the Preparation.

With some raw materials, e.g., liver, the above step and the antecedent Preparation 1 preferably is carried out with 0.1 M manganese sulfate providing the bivalent metal. Transchelation, i.e., removal of most manganese and replacement by magnesium, is achieved using tris-maleate-magnesium salt buffer in a subsequent step. In some cases, it is desirable to carry the manganese-tris-maleate buffer through the pigment removal step and sometimes even through the heat-treatment step. In still other cases, use of buffer containing other bivalent ions, e.g., Ca, Co, Cu, Fe, Zn, may be desirable in the initial and/or intermediate steps. About a 50% or less yield of powder is obtained, based on the dry weight of the proteins in the starting natural source.

B. Pigment Removal

This step often is necessary with protein fractions obtained from dark-colored sources, e.g., liver, kidney, lung, spleen, jackbeans, certain bacteria, etc. Proteins from other tissues, such as testes, pancreas, placenta with blood clot removed, thymus, heart and other muscle, marine animals and other microorganisms usually do not require this step.

100 g. of powder from Step A are suspended with stirring in 400 ml. cold 0.1 M tris-maleate-$Mg^{++}$ buffer at pH 7.2. Let stand in cold room until the precipitate has settled, centrifuge at 1–2° C. and decant.

If pyridine is used, divide the decanted liquid into five equal parts. Slowly and with stirring, add to each 8.0 ml. of pre-cooled c.p. pyridine. Then add 40 ml. of 0.1 M tris-maleate-$Mg^{++}$ buffer to each portion. Centrifuge at 1–2° C., e.g., at 13,000 r.p.m. for 15 minutes. Decant and recombine the supernatants. Discard the precipitate.

If chloroform-ethanol is used, to the decanted liquid slowly and with stirring add 15% by volume of a pre-cooled mixture of one part chloroform and two parts ethanol. The temperature should remain below 4° C. during the addition. Centrifuge, e.g., at 12–14,000 r.p.m. for about 10 minutes, and discard the dark-colored precipitate. The lightly colored, opalescent supernatant is kept cold.

At this point, the partially purified desired protein can be precipitated with solvent, the precipitate freed of adhering solvent in vacuum, re-dissolved in about 0.15 M tris-maleate-$Mg^{++}$ buffer, pH 7.4. Any insolubles are removed by centrifugation and discarded.

The thus-obtained solution can be lyophilized, with or without prior dialysis. The resulting off-white powder is stable for several months when kept in the freezer.

C. Less Soluble Material Removal

The cold tris-maleate-$Mg^{++}$ buffer solution from Step A or B at a pH of about 6.0 to 7.5, or its freshly made equivalent from lyophilized powder, is brought to 40–45% of saturation with ammonium sulfate, added with stirring in portions either as solid or as saturated aqueous solution. Hold the temperature at 0–5° C. Keep the mixture 10–30 minutes in the cold until precipitation is complete. Centrifuge at 8,000–12,000 r.p.m. and discard the precipitate. Keep the supernatant for several hours in the cold. Centrifuge and discard any further precipitate.

Alternatively, to a 250 ml. portion of the supernatant obtained from Step B or 62 g. of pigment-free protein obtained in Step A and dissolved in 250 ml. of 0.1 M tris-maleate-$Mg^{++}$ buffer at pH 7.5, slowly add with stirring about 0.9 volumes of ethanol or about 0.75 volumes of acetone pre-cooled to —10° C., i.e., an amount sufficient to precipitate only a portion of the proteins. The temperature of the mixture should not exceed +2° C. As soon as precipitation is complete, centrifuge in the cold, e.g., at 8,000–12,000 r.p.m. and discard the precipitate.

D. Heat Labile Protein Removal

Heat the supernatant obtained from Step C in a round-bottom flask or glass lined kettle in a bath kept at 65–70° C. Stir the solution vigorously until the temperature of the contents reaches about 59° C. and hold for about 20 minutes at or near this temperature. Immediately thereafter immerse the flask into a Dry Ice-solvent or an ice-salt bath and continue stirring vigorously until the temperature has dropped to 2–5° C. Centrifuge the resulting bulky precipitate in the cold and discard.

E. More Soluble Material Removal (1) Salt Precipitation: Preferably at a pH of about 6.0 saturate the buffer solution from Step D with ammonium sulfate as above to 58–76% and hold ½ to 2 hours in the cold until precipitation is complete.

Take up the nearly white ammonium sulfate precipitated material in 10–15 times its weight of 0.10 M tris-maleate-$Mg^{++}$ buffer and hold for ½ hour in the cold. Centrifuge off and discard any insoluble or further precipitate.

(2) Solvent Precipitation: To the same starting solution as used in (1), preferably at a pH of about 3.5 or about 7.5, add in portions and with stirring pre-cooled (−10° C.) acetone or ethanol, keeping the temperature around 0° C., in an amount sufficient to precipitate at least a portion of the proteins in solution. If, for instance, 0.5 volumes of acetone were used to precipitate less soluble proteins, use about 0.5 to 1.5 additional volumes. Keep the mixture for a few minutes at about 0° C. until the precipitation is complete. Centrifuge the precipitate at 1° C. or below (10,000–13,000 r.p.m.). Separate and free the precipitate from adhering solvent under vacuum in the cold. Check the supernatant for the extent of precipitation by addition of 0.2 volume of pre-cooled (−10° C.) acetone or ethanol. Isopropyl alcohol (0.5–2 v./v.) can also be used.

Preferably, ammonium sulfate fractionation is used to precipitate the less soluble proteins and solvent fractionation to precipitate the desired protein.

F. Electrophoresis

Fractionate a solution of the protein precipitated by Step E in 10–15 times its weight of 0.1 M tris-maleate-$Mg^{++}$ buffer (discarding any insoluble material) by gel electrophoresis using polyacrylamide with the running gel at pH 8.0 to 9.5 or at pH 3.0 to 4.3.

The following apparatus is used in the gel electrophoresis step:

Electrophoresis Chamber; Buchler Power Supply; Loading Rack; Syringes (disposable plastic 20 cc., 5 cc., 1 cc.); Syringe Needles 22G x 1½ and 25G x ⅝; Teflon Tips for layering tool; Photopolymerizing light (fluorescent light source).

The electrophoresis chamber should be thoroughly washed and rinsed in distilled water. The chamber is then immersed in a Siliclad (Clay-Adams, New York) solution (1 part Siliclad to 50 parts of water) for a few minutes. It is then rinsed and oven-dried.

The electrophoresis chamber used is the special production model described heretofore.

The reagents used are the following:

Acrylamide monomer (Eastman No. 5521); N,N'-Methylenebisacrylamide BIS (Eastman No. 8383); Riboflavin (Eastman No. 5181); N,N,N',N' - Tetramethylethylenediamine TEMED (Eastman No. 8178); Glycine (Eastman No. 445); TRIS (Tris-hydroxymethyl-aminomethane) (Fisher T–395); Sucrose (Baker No. 4072); Ammonium persulfate Reagent grade; 1 N HCl; 1 M $H_2PO_4$; Acetic Acid; and Methanol (Reagent Grade). Small pore gel, 7% is used.

The stock solutions used are:

(a) 1 N HCl, 480 ml.; TRIS, 363 g.; TEMED, 4.6 ml.; and $H_2O$ to make 1,000 ml. (b) 1 M $H_3PO_4$, 256 ml.; TRIS, 57 g.; and $H_2O$ to make 1,000 ml. (pH 6.9). (c) Acrylamide, 280 g.; BIS, 7.36 g.; and $H_2O$ to make 1,000 ml. (d) Acrylamide, 100 g.; BIS, 25 g.; and $H_2O$ to make 1,000 ml. (e) Riboflavin, 40 mg. and $H_2O$ to make 1,000 ml.

Working solutions used are:

Mixture A: 1 part (a); 2 parts (c); and 1 part ($H_2O$).
Mixture B: Ammonium persulfate, 1.00 g.; and $H_2O$, 1,000 ml.

The buffer solution used is: TRIS, 60 g.; Glycine, 288 g.; $H_2O$ to 20 liters; pH, 8.45.

Tracking Dye used is 0.001% Bromphenol Blue. It was found that for the best separations fresh buffer should be used for each run. The buffer can be used for a maximum of 3 runs with some loss of resolution on the second and third runs. All solutions should be stored in the refrigerator. If they are, they are usable for several months, except Mixture B which should be made fresh weekly.

Equal parts of Mixture A and Mixture B taken directly from the refrigerator are mixed in a filtering flask. The flask is attached to the aspirator and the contents are swirled gently for about a minute in a partial vacuum. The chamber is then filled with the cover on, to ⅝ inch from the top using a long thin tube. The thin tube is inserted to the bottom of the chamber and is slowly withdrawn as the slab is filled, keeping the tip beneath the gel surface. The gel is then water layered and placed on top of a drying oven. Gelling is complete in about 15 to 30 minutes.

A water layering tool can be made from a plastic syringe and a 25G x ⅝ inch needle tipped with a Teflon tip (Analytical Chemists, Inc.). The syringe is filled about ⅓ full with water, tinted blue with tracking dye solution. The Teflon tip is placed just beneath the surface of the gel and moved upwards as the water is expelled onto the gel. The tip should at no time be lifted above the surface of the liquid.

After polymerization, the water is carefully removed. The surface is rinsed once with degassed sucrose gel.

The sample (0.5–5.0 g.) is suspended in water, 0.9% saline or in TRIS buffer, mixed with gel and filled into the pre-formed trough of the gel slab. The surface is sucrose layered and sealed with a capping gel. Capping gel is added until a convex miniscus is formed. A plastic cover is then slid across the top so that no air bubbles are trapped. The loaded trough is placed between two fluorescent lamps as close to the lights as possible. Polymerization is complete between 30 minutes and an hour depending on the amount and nature of sample used.

When polymerization is complete as indicated by opacity of sample and capping gels, the cover is removed and the chamber loaded into the buffer reservoirs. The apparatus and buffer are pre-cooled before a run and the run is made at about 5° C. or less. The power supply is set to give constant current which is set at 100–200 ma. depending on the amount of sample and the size of the gel slab. A run takes 2–6 hours and at the end the tracking dye will have traversed nearly the whole slab.

After the run, the desired orgotein is found in the area comprising about 20–30% of the distance travelled by the tracking dye from the point of origin. It is well-separated from the much faster travelling albumin and albumin-type fractions and also well-separated from the small amounts of much slower travelling extraneous protein fractions.

The desired orgotein is eluted from the gel by a cross-current of tris-maleate buffer 0.1 M containing 0.001 M $Mg^{++}$. Progress of the elution is monitored by U.V. absorption at 280 m$\mu$. Uniformity is checked by analytical disc gel electrophoresis followed by staining with Amido Black. If desired, the albumin-type and the slow fractions can be recovered in a similar manner using tris-maleate buffer.

In the cationic system at pH 3.8 in the running gel, potassium ion is used as the leading ion and β-alanine as the trailing ion. Acetic acid is used as the buffer. The procedure followed with these systems is the same as that used with the anionic system (running gel pH 9.4).

To isolate the desired orgotein from the eluate, dialyze exhaustively against 0.001 M tris-maleate-$Mg^{++}$ buffer and then against deionized water and lyophilize. A white fluffy powder representing about 6–16% of the ammonium sulfate or solvent precipitated product is obtained.

A typical overall yield of isolated orgotein is 0.005 to 0.015%, calculated on the dry weight of the original source material.

EXAMPLE 3

All operations, unless otherwise indicated, are carried out in a cold room (2–5° C.).

Preparation

Fresh beef liver is ground into a plastic container. Cold distilled water (two liters per kg. of liver) is added with stirring and the mixture is adjusted with 0.1 N sodium hydroxide to pH 7.5 to 7.6. Sufficient 2 M manganese sulfate solution is added to bring the molarity of the mixture to 0.05. The pH is adjusted to 7.6 and fresh cold water is added to bring the water to three liters per kg. of liver. Thereafter, 50 ml. of toluene per kg. of liver are added and the mixture is stirred in the cold room overnight.

Removal of More Soluble Material

The next morning the suspension is passed through plastic gauze and to the filtrate 1.5 volume of cold acetone (−10° C.) is added with gentle stirring. The acetone is added through a glass tube extending well below the surface of the mixture. The ensuing precipitate is immediately collected by centrifuging and then right away suspended with about 25% (v./v.) of 0.05 M maleate-$Mn^{++}$ buffer, calculated upon the volume of the filtrate before addition of the acetone. The mixture is stirred in the cold room for several hours, passed through plastic gauze and clarified by centrifuging.

Heat Labile Protein Removal

The supernatant is heated rapidly to about 60° C. with stirring in a stainless steel or glass lined kettle and maintained at or close to 60° C. for about 20 minutes. Thereafter, the mixture is cooled to about 5° C. as rapidly as possible and the bulky precipitate is removed in the cold room by slow suction over a broad filter surface or by centrifugation. The clear solution is brought to 2–5° C. and 0.9 volume of denatured ethanol (−10° C.) is added from a reservoir through a glass tube extending well below the surface of the mixture. Effective stirring is essential and the temperature must remain at 5° C. or lower.

After the addition of the alcohol has been completed, the mixture is kept in the cold room just long enough to permit the precipitate to compact and to settle. The precipitate is recovered by vacuum filtration or centrifugation and immediately dissolved in cold 0.001 M maleate-$Mn^{++}$ buffer, pH 7.0. The amount of buffer is approximately 4 v./wt. The solution is clarified by centrifuging, the supernatant decanted, the precipitate re-extracted using small amounts of cold buffer, the supernatants combined and lyophilized. Prior dialysis to remove buffer ions, while possible, is not necessary at this point. The resultant powder is stable for several months at room temperature but preferentially is kept in the cold room. It represents a mixture of the desired orgotein, arginase and other enzymes, albumin and other non-essential proteins.

Removal of Less Soluble Material and Transchelation

For further processing, this powder is dissolved in about 12 times the volume of cold 0.2 M Tris–0.001 M $Mg^{++}$ buffer, pH 7.8. This solution is treated with cold saturated ammonium sulfate solution, 0.001 M in $Mg^{++}$. Five increments of 375 ml. each are added per 1000 ml. of buffer solution. The respective states of saturation achieved by this technique are 15%, 30%, 45%, 60% and 75%. In each instance the addition of the ammonium sulfate solution is carried out slowly at 0–5° C. with stirring. Stirring is continued for another ten minutes and the resulting precipitate is collected by centrifuging at 4500 r.p.m.'s for thirty minutes at 0° C.

Of the five precipitates obtained, the first one (A) is discarded. It represents high-molecular weight-protein impurities. The second and third precipitates (B and C) are combined. They represent arginase and other enzymes which can be processed separately for the isolation of these products. The fourth and fifth (D and E) are also combined. They contain the desired orgotein, in a still crude state, contaminated with albumin and various other proteins both of lower and higher molecular weight. The final supernatant is discarded. It contains low molecular proteins and other undesirable impurities.

Chromotography

Precipitates D and E are dissolved in 0.03 M Trisglycine–0.001 M $Mg^{++}$ buffer, pH 7.8 at a concentration as close to 10% (w./v.) as possible and dialyzed against cold buffer until negative to sulfate ion. The dialyzed solution is clarified by centrifugation and the supernatant is passed through a Millipore filter. The filtrate is applied directly to the head of a chromatography column (3 x 18 inches) filled with Sephadex G–100 (crosslinked dextran resin, Pharmacia, Sweden). The Sephadex has been swelled, defined and washed by standard techniques described in literature of the manufacturer. The packed column is equilibrated with 0.03 M Tris-glycine–0.001 M $Mg^{++}$ buffer, pH 7.8 and adjusted to a flow rate of about 20 ml. per hour.

After application to the column, the sample is permitted to equilibrate within the first few cm. of the resin bed for approximately 30–45 minutes when fractionation is started. Individual fractions of up to 10 ml. are collected. The emergence of peaks is determined by measuring the protein concentration by the absorbance at 280 millimicron.

Two and sometimes three peaks emerge from the column prior to the emergence of the desired orgotein. They represent albumin and other undesirable protein impurities of similar or larger molecular weight. Fractions representing these peaks are discarded. The desired protein generally emerges in the range of 100–150 ml. of total eluate. These fractions are combined for further processing. Residual, lower molecular weight protein impurities emerge from the column on further elution, particularly on increasing the ionic strength of the buffer. They are removed to clear the column for a subsequent run.

The combined fractions containing the desired orgotein
Buffer and Excess $Mg^{++}$ Ion Removal are dialyzed against deionized $H_2O$–0.001 M $Mg^{++}$ until they contain less than $10^{-6}$ M Tris buffer. Thereafter, dialysis is continued against deionized water containing 1–$5\times10^{-3}$ M ortho-phenanthroline or ethylenediamine tetraacetic acid salts until the concentration of $Mg^{++}$ has been reduced to less than $10^{-7}$ M. If a protein chelate is desired whose predominant metal is other than magnesium, e.g., calcium, copper, iron or zinc, expose the protein after dialysis for about a day to a soluble salt of the metal of choice of a molarity which maintains the protein in solution, and then remove excess metal ion in the manner described above. The resultant solution is clarified by centrifuging and the supernatant is treated in either of two ways. For the preparation of bulk protein powder the solution is lyophilized. For the preparation of sterile protein solution for injection purposes, dextrose is added to the solution to 5% w./v. The dextrose solution is then sterilized by Millipore filtration and filtered into pre-sterilized ampules or vials under sterile conditions to be used as such or as a lyophilized powder.

75 kg. of fresh beef liver, which contains about 70% water and is equivalent to about 22.5 kg. of dry matter, yields about 200 grams (1%) of the $Mn^{++}$ chelate intermediate.

200 Grams of the $Mn^{++}$ chelate yield 12.5–17.5 grams (0.06–0.08%) of combined D and E fractions. On Sephadex chromatography, these amounts of D and E fractions yield 2.4 to 2.9 grams of the desired protein, equivalent to an overall yield of 0.011–0.014% calculated on the dry weight of the liver.

EXAMPLE 4

The following are examples of an improved process for the isolation of orgotein claimed in the application of W. Huber, Ser. No. 150,809 now U.S. 3,687,927, filed June 7, 1971, as a continuation-in-part of Ser. No. 657,866, filed August 2, 1967, now abandoned.

All operations, unless otherwise indicated, are carried out in a cold room (2–5° C.).

a. Removal of Insoluble Material

Finely macerated fresh beef liver is mixed with cold 0.025 M tris-glycine buffer containing 0.01 M $Mn^{++}$ at pH 7.5 (two liters per kg. of liver). Adjust pH to 7.5 if necessary. Thereafter, if the liver is fatty, 50 ml. of toluene per kg. of liver are added. The mixture is stirred 4–6 hours. The resulting suspension is centrifuged at 20,000 G for 10–20 minutes or pressed through plastic gauze and the insolubles discarded.

b. Removal of More Soluble Material

To the aqueous filtrate obtained in the preceding step is added rapidly and with thorough agitation 1.25 volumes of cold acetone (−10° C.) through a glass tube extending well below the surface of the mixture. The ensuing precipitate is immediately collected by centrifuging, e.g., for 10 minutes at 20,000 G. Completeness of precipitation is checked by adding an additional 0.25 to 0.50 volumes of acetone to the filtrate. Any additional precipitate is also collected. The precipitated proteins are quickly suspended with about 25% (v./v.) of 0.025 M tris-glycine buffer at pH 7.5 containing 0.01 M $Mn^{++}$, calculated on the volume of the filtrate before addition of the acetone. The mixture is stirred in the cold room for several hours. The insolubles are removed by centrifuging and the clear supernatant is adjusted to achieve an about 10% protein concentration. Protein concentration can be determined by Biuret analysis or other standard method.

c. Heat Labile Protein Removal

The thus-obtained buffer solution is heated rapidly to about 60° C. with stirring in a stainless steel or glass lined kettle and maintained at or close to 60° C. for about 20 minutes. Thereafter, the mixture is cooled to about 5° C. as rapidly as possible and the bulky precipitate is filtered in the cold room by slow suction over a broad filter surface or centrifuged at 12,000 to 16,000 G for 10 minutes. The precipitate is re-extracted, using small amounts of cold buffer, and the clear supernatants combined. The precipitate is discarded.

Removal of Less Soluble Material and Transchelation

The solution from the heat treatment step is concentrated, if necessary, to a protein concentration of about 8%, e.g., using an ion selective membrane (Diaflo Membrane, Amicon Corp., Cambridge, Mass.) to remove excess buffer. The protein solution is mixed slowly and with stirring with cold saturated ammonium sulfate solution containing $10^{-3}$ M $Mg^{++}$, $10^{-4}$ M $Cu^{++}$ and $10^{-5}$ M $Zn^{++}$ to a 40% $(NH_4)_2SO_4$ concentration. Stirring is continued for another 15 minutes and resulting precipitate is removed by centrifuging at 20,000 G for thirty minutes at 0° C. and discarded. To the filtrate is added an additional amount of the saturated ammonium sulfate solution to bring the protein solution to 65% $(NH_4)_2SO_4$ concentration. The resulting precipitate contains the desired protein and is collected by centrifugation or filtration. The final supernatant is discarded.

e. Gel Filtration

The final precipitate from the $(NH_4)_2SO_4$ step is dissolved in 0.025 M tris-HCl or tris-glycine or 0.01 M phosphate or borate buffer, containing $10^{-3}$ M $Mg^{++}$, $10^{-4}$ M $Cu^{++}$ and $10^{-5}$M $Zn^{++}$, at pH 7.8 to a concentration as close to 10% (w./v.) as possible and dialyzed against cold buffer until negative to sulfate ion. The dialyzed solution, after clarification by centrifugation, if necessary, is passed through a Millipore filter. The filtrate is applied directly to the head of chromatography columns (3 x 18 in.) filled with Sephadex G–100 or G–75 (epichlorohydrin cross-linked dextran resin, Pharmacia, Sweden). The Sephadex has been swelled, refined and washed by standard techniques described in literature of the manufacturer. The packed columns are equilibrated with one of the above-described buffers and adjusted to a flow rate of about 20 ml. per hour. The addition of 5–10% dextrose or sucrose to the solution improves uniformity of adsorption, which facilitates subsequent resolution.

After application to the column, the sample is permitted to equilibrate within the first few cm. of the resin bed for approximately 30–45 minutes, at which time fractionation is started, the column being developed with additional buffer solution. Individual fractions of up to 10 ml. are collected. The emergence of peaks is determined by measuring the protein concentration by the absorbance at 280 millimicron.

Two and sometimes three peaks emerge from the column prior to the emergence of the desired protein. They represent albumin and other undesirable protein impurities of similar or larger molecular volume. Fractions representing these peaks are discarded. The desired protein generally emerges in the range of 130–170 ml. of total eluate. These fractions are combined for further processing. Residual, lower molecular weight protein impurities emerge from the column on further elution, particularly on increasing the ionic strength of the buffer. They are removed to clear the column for a subsequent run.

f. Buffer and Excess $Me^{++}$ Ion Removal

The combined fractions containing the desired protein are filtered through a column of mixed bed resin Amberlite MB–1 Monobed gel-type Ion Exchange Resin, (Rohm & Haas), a styrene-divinyl benzene strongly acidic ($-SO_3^-H^+$) strongly basic

group-containing mixed copolymer which reduces buffer, $Mg^{++}$, $Cu^{++}$ and $Zn^{++}$ iron concentration to less than $10^{-7}$ M.

A column 1.45 x 45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milli-equivalents, based on a factor of 0.46 given by the manufacturer for this resin.

The fractions from the gel filtration step containing the desired protein are combined and concentrated, if necessary, to a protein content of 8–10%. This solution is carefully loaded onto the top of the column and thereafter developed with demineralized water. The flow rate is adjusted to about 20 milliliters per minute and the appearance of the protein in the eluate is monitored by ultraviolet absorption ($A_{280}$). The eluate is collected in about 25 milliliter fractions. The desired protein generally appears in the fourth to twelfth fractions. Buffer-Me++ concentration drops well below $10^{-7}$ M, as indicated by a drop of conductivity from 4,000 to 5,000 mho before column filtration to 1.5 – 2.5 mho thereafter.

For the preparation of a sterile protein solution for injection purposes, fructose, sucrose or other saccharide is added to the resulting buffer solution to a concentration of 2 parts saccharide per part protein. The solution is then sterilized by ultra-filtration and filtered into presterilized ampoules or vials under sterile conditions. The resulting product can then be lyophilized to produce a more stable product.

Following the above-described process, 75 kg, of fresh beef liver (22.5 kg, dry weight), yields about 25–40 grams (0.12–0.17) of final precipitate from the $(NH_4)_2SO_4$ step and 7 to 9 grams of the final, fully purified desired protein, equivalent to an overall yield of 0.032 – 0.041% calculated on the dry weight of the liver, a 300 or more percent increase in yield over that obtained by the process described in Ser. No. 576,454.

In an alternative procedure, the filtrate from Step (a), instead of being diluted with acetone, is first heated for about 20 minutes at or close to 60° C., then rapidly cooled to about 5° C. The resulting precipitate is removed by filtration or centrifugation and discarded. The filtrate is then treated with acetone as in Step (b). Step (c) is omitted. The precipitate obtained from the acetone treatment is dissolved in 0.025 M tris-glycine buffer containing $10^{-3}$ M Mg++, $10^{-4}$ M Cu++, $10^{-5}$ M Zn++ at pH 7.5 adjusted if necessary to a protein concentration of about 8% and then treated as in Steps (d), (e) and (f).

EXAMPLE 5

The following is an example of a process for the isolation of orgotein from red blood cells claimed in the application of W. Huber, Ser. No. 815,175 filed Apr. 10, 1969, now U.S. 3,579,495.

Fresh beef blood was centrifuged at 2,600× G for 10 minutes at 0° C. and the plasma decanted. The red cells were then washed repeatedly with 2 to 3 volumes of 0.9% saline solution. The washed red cells were hemolyzed by mixing with 1.1 volumes of cold deionized water containing 0.02% detergent (Saponin). After a minimum of 30 minutes at 4° C., 0.25 volume (per volume of hemolysate) of ethyl alcohol at −15° C. was slowly added with stirring followed by 0.31 volume (per volume of hemolysate) of chloroform, also at −15° C. Stirring was continued for about 15 minutes at −5° C. or below, at which time the mixture was a thick paste. The hemoglobin precipitation was carried out in a cold bath which was kept at below −10° C. After the paste had stood for a further 15 minutes at 4° C., 0.2 volume of cold 0.15 M NaCl solution was added, giving an easily poured suspension. The precipitate and excess chloroform were removed by centrifuging at 20,000× G at about −10° C. for 10 minutes. The supernatant liquid was filtered and dialyzed against cold-deionized water. The dialyzed solution was lyophilized.

The alcohol-chloroform precipitate was re-extracted with a minimum amount of deionized water by blending the precipitate and water in a blender and centrifuging. Usually, a volume of water equal to that of the volume of starting red blood cell is needed. The re-extraction solution was dialyzed and lyophilized. Re-extraction of the precipitated hemoglobin often yields 30–50% of protein mixture present in the original supernatant. Depending upon the structure of the precipitate, a second re-extraction may give an additional 10–15%.

The lyophilized material was re-dissolved in 0.025 M tris-glycine buffer containing 0.001 M Mn++ at pH 7.5 (usually to a concentration of 20 mg./ml.). The solution was heated at or close to 65° C. for about 15 minutes. This step removes carbonic anhydrase and other heat labile enzymes from the solution. After heating, the solution was quickly cooled in an ice bath to about 5° C. The solution was then centrifuged at 20,000× G at 0° C. for 10 minutes to remove the precipitate. The supernatant was dialyzed against deionized water to remove excess metal ions and buffer and then lyophilized. The resulting solid is rich in orgotein.

(a) Gel Filtration

Sephadex G–75 is slowly added to warm deionized water (approximately 60° C.) with continuous stirring. The vessel containing the mixture is then placed in a 60° C. water bath for five hours and 45 minutes, removed and allowed to stand for one hour at room temperature. The supernatant and fines are decanted by suction. Buffer is added to the swollen Sephadex gel at four to five times its volume. The Sephadex gel is stirred, allowed to settle, and the fines and supernatant removed by suction. Fresh buffer is again added to the swollen gel, and the above process repeated four times. The final suspension is chilled to 4° C. and then deaerated under reduced pressure before use.

A recirculating column made of polymethacrylate is used. The column is 1050 mm. long and has an internal diameter of 32 mm. In filling the column with degassed buffer, special care is taken to insure that no air bubbles are trapped near the filter and on the sides of the column. The buffer filled column is then moved into the cold room and clamped into a vertical position with the aid of a carpenter's level. After equilibration in the cold room, the gel slurry is poured into a funnel connected to the top of the column with continued mechanical stirring. When a layer of Sephadex a few centimeters thick has formed on the bottom of the column, the outlet at the bottom of the column is opened to allow an even flow. During the packing, a rising horizontal surface of gel in the tube indicates proper uniformity in packing. After approximately 95 cm. of gel has settled, the excess gel and buffer are removed. After the top surface of the gel has completely settled, the top of the column is closed with a plunger fitted with a filter disc. Buffer is then circulated through the column for two days in order to stabilize the bed. Flow rate is maintained at 10 ml. per hour. Final bed volume $V=\pi r^2 h=(3.14)(1.6\ cm.)^2 (96.5\ cm.)=775.7$ cc.

The lyophilizate from the heating step is dissolved in buffer (20 mg./ml.). Insolubles, if present, are removed by centrifugation followed by Millipore filtrations. The clear solution is loaded on the column using an LKB selector valve (Model 4911B).

All column runs are performed at 4° C. The buffer used is 0.05 M Tris-HCl, pH 7.5, 0.15 M in KCl and 0.005 M in glycine, containing $10^{-3}$ M Mg++, $10^{-4}$ M Cu++ and $10^{-5}$ M Zn++.

The protein solution is loaded from the bottom. Ascending buffer flow rate is maintained at 10 ml. per hour. Protein content of fractions is determined by absorbance at 280 m$\mu$.

The elution volume for each protein can be monitored both volumetrically and gravimetrically.

If prior processing has proceeded normally, the first peak which emerges from the column is orgotein. It generally emerges in the range of 300–400 ml. of total eluate. These fractions are combined for further processing. Following the main, well defined peak is sometimes a shoulder which contains orgotein mixed with small amounts of a minor impurity, which need not be separated. However, it can be separated by collecting the eluate fractions separately, and then further purified by recycling. Lower molecular weight protein impurities emerge from the column substantially later, upon further elation. They are removed to clear the column for a subsequent run.

(b) Buffer and Excess Metal Ion Removal

The orgotein solution obtained from the gel filtration is filtered through a column of mixed bed resin Amberlite MB-1 Monobed gel-type Ion Exchange Resin (Rohm & Haas), a styrene-divinyl benzene strongly acidic

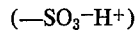

strongly basic

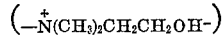

group-containing mixed copolymer which reduces buffer and unbound $Mg^{++}$, $Cu^{++}$ and $Zn^{++}$ ion concentrations to less than $10^{-7}$ M. Alternatively, this can be done by dialysis.

A column 1.45 x 45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milliequivalents, based on a factor of 0.46 given by the manufacturer for this resin.

The eluate from the gel filtration step containing the orgotein is concentrated, if necessary, to a protein content of 8-10%. This solution is carefully loaded onto the top of the column of ion exchange resin and thereafter developed with demineralized water. The flow rate is adjusted to about 20 milliliters per minute and the appearance of the protein in the eluate is followed by ultraviolet absorption ($A_{280}$). The eluate is collected in 25 to 50 milliliter fractions. The desired protein generally appears in the fourth to twelfth fractions. Buffer-$Me^{++}$ concentration drops well below $10^{-7}$ M, as indicated by a drop of conductivity from 4,000 to 5,000 mho before column filtration to 1.5-2.5 mho thereafter.

By the same procedure orgotein congeners having the properties given above can be isolated in >98% purity from horse, sheep, rabbit and chicken red blood cells in 0.01, 0.005, 0.008 and 0.006% overall yield, respectively, and also from human, pig, and other mammalian red blood cells.

EXAMPLE 6

The following is an example of a process claimed in the application of W. Huber, Ser. No. 3,492, filed Jan. 16, 1970, now U.S. 3,624,251 for the removal of the small amount of tenacious extraneous protein present in substantially pure orgotein isolated from beef liver in the manner described in Examples 1-3.

Solutions of a production lot of orgotein of about 90% purity at a concentration of 5 mg. protein per ml. of 0.005 M glycine buffer, pH 8.5, in 0.9% saline were pipetted into each of five clean glass containers of equal size. This lot of orgotein contained 10.5% slow moving protein impurity, based on stain intensity (Amido Black) of electrophoretically separated slow-moving protein. Container 1 was used as a control, and containers 2 to 5 were heated at 70° C. at 15, 30, 45 and 60 minutes, respectively.

After heating, the orgotein solution in each of the containers, including the control, was filtered through Millipore. A biuret protein determination was made on the clear filtrate. Each of the containers contained the following:

|  | Ml. |
|---|---|
| Filtered orgotein solution | 0.5 |
| Buffer | 0.5 |
| Biuret reagent | 1.5 |

The heated samples were examined electrophoretically in agarose thin film gels. Slow moving and backward moving material in the orgotein sample was removed to some degree after heating 15 minutes at 70° C., and more so after heating 30 minutes at 70° C. They were completely removed after heating for 45 and 60 minutes at 70° C. At this point the background of the electropherogram looked much clearer, also. Orgotein loss was 12-16%.

EXAMPLE 7

The following is an example of another process for the removal of the tenacious impurity present in substantially pure orgotein isolated from beef liver in the manner described in Examples 1-3, which process is claimed in the application of W. Huber Ser. No. 3,538, filed Jan. 16, 1970 and now abandoned in favor of U.S. 3,758,682.

Impure lots of orgotein containing 28.2, 20.9 and 27.8%, respectively, of "slow moving" (on gel electrophoresis in thin film argarose) impurities and 17.1, 19.9 and 11.8%, respectively, of "background impurities" (causing a smearing on gel electrophoresis) were selected by virtue of their high content of impurities from rejected batches. In the Ungar anti-inflammatory bioassay one of these lots had failed badly while the others had failed marginally.

The buffer used was 0.1 M phosphate, pH 6.0; $NaH_2PO_4$—$N_2HPO_4$ (1:7 vol./vol.). The anion exchange resin used was Whatman DEAE cellulose-52, microgranular (W. & R. Balston, Ltd., Hardstone, Kent, England). This ion exchanger is supplied wet and pre-swollen, thus obviating the need for re-suspension.

To prepare the column, 30 g. of the DEAE-cellulose was stirred into 300 ml. of 0.1 M phosphate buffer, pH 6.0. The slurry was allowed to settle and the supernatant decanted. 0.01 M phosphate buffer, pH 6.2, was added and the mixture stirred thoroughly. The slurry was allowed to settle for 10 minutes and the supernatant decanted. This step serves both to equilibrate the cellulose with the buffer and to remove the fines, which is important since they reduce the column flow rate. Washing the cellulose with the starting buffer was repeated until both the pH and the conductivity remained constant at the correct values. Gentle vacuum was applied to the slurry to remove occluded air and carbon dioxide. The slurry was used immediately for column packing. If the resin is left in contact with buffers or polyelectrolytes for longer than one week, a preservative, e.g., 0.03% toluene, should be added.

A glass column of 1.5 cm. diameter fitted with a nylon net and a Millipore filter support unit at the bottom was mounted vertically. The column was filed with 0.01 M sodium phosphate buffer, pH 6.2. The equilibrated and relatively thick DEAE-cellulose slurry (about 120-150% of original volume) was poured into the column through a funnel attached to the top of the column. The column top was closed until 1 cm. of the cellulose had settled at the bottom. The column top was then opened to allow free flow. A column of about 20 cm. was packed using settling times of 20-30 minutes. The slow sedimenting fines at the top of the column were removed by suction. The column was equilibrated by running starting buffer through for several hours or overnight. The pH and conductivity of the eluate were checked to ensure full equilibration between the exchanger and the buffer. Flow rate was adjusted by hydrostatic pressure by placing the buffer source about 40 cm. above the head of the column, which produces a flow rate of about 30 ml. per hour for a column of 1.5 cm. in diameter and 20 cm. in heght with a bed volume of 30 ml.

100-200 mg. of the starting orgotein was dissolved in 2-4 ml. of starting buffer and the resulting greenish solution layered gently over the surface of the bed. After absorption, the orgotein solution appears as a broad greenish band near the top of the column. The column was then connected to the buffer reservoir and elution begun with 0.01 M phosphate buffer, pH 6.2. Five ml. fractions were collected, using a Simplex (B. Braun, Melsungen, West Germany) fraction collector. The column was operated at room temperature and the collected fractions were cooled by ice water. Upon application of the elution buffer, a brownish-pink band separated from the sample zone on the column. It moved rapidly downwards and was eluted immediately after the void volume, requiring a buffer volume of 40–50 ml. The material had a high absorbance at 280 m$\mu$ and by subsequent gel electrophoresis was shown to consist entirely of the slow moving impurity described above. After pooling of the fractions containing the slow-moving impurities, elution was contained with 0.01 M phosphate buffer, pH 6.2, to a total volume of about 300 ml. After about 120 ml. of eluate had been collected, additional material with less pronounced absorbance at 280 m$\mu$ was eluted. Subsequent electrophoresis of appropriately pooled fractions showed this material to be composed of background impurities described above. After elution of the background impurities, no further material could be eluted with 0.01 M phosphate buffer, pH 6.2.

Elution of the orgotein was carried out by stepwise increase of buffer ionic strength. No significant elution was observed until ionic strength had been increased about tenfold to 0.10 M, pH 6.2. At this point the zone remaining at the top of the column migrated rapidly downward as a sharp, light green band with the buffer front. Complete elution was achieved with about 60 ml. of 0.1 M buffer.

Eluted fractions 68 to 76, which contained the orgotein, were pooled, extensively dialyzed and then lyophilized. Dialysis for 3 to 5 days with numerous changes of deionized water were required to remove all extraneous non-chelated ions. In subsequent runs, increased ionic strength was achieved by the addition of 0.09 M NaCl to the starting buffer. This reduced the dialysis time required to remove extraneous non-chelated ions to about 2 days.

What is claimed is:

1. In a process for the production of orgotein which comprises at least one step of fractionating an aqueous solution of a mixture of buffer soluble proteins comprising the orgotein, the improvement which comprises conducting the fractionation step with the mixture of proteins dissolved in a buffer solution containing dissolved therein in at least $1 \times 10^{-4}$ concentration at least one salt of a divalent metal having an ionic radius of 0.60 to 1.00 A.

2. A process according to Claim 1 comprising a plurality of such fractionating steps.

3. A process according to Claim 1 comprising a heating step in which extraneous proteins are insolubilized.

4. A process according to Claim 1 wherein the divalent metal has an ionic radius of from 0.65 to 0.79 A.

5. A process according to Claim 4 wherein the buffer solution contains dissolved therein at least one of a $Cu^{++}$ and a $Zn^{++}$ salt.

6. A process according to Claim 5 wherein the buffer solution also contains dissolved therein both a $Cu^{++}$ and a $Zn^{++}$ salt.

7. A process according to Claim 4 comprising a plurality of such fractionating steps.

8. A process according to Claim 7 comprising a heating step in which extraneous proteins are insolubilized.

9. A process according to Claim 8 wherein the buffer solution contains dissolved therein at least one of a $Cu^{++}$ and a $Zn^{++}$ salt.

10. A process according to Claim 9 wherein the buffer solution also contains dissolved therein both a $Cu^{++}$ and a $Zn^{++}$ salt.

References Cited

UNITED STATES PATENTS

| 3,579,495 | 5/1971 | Huber | 260—115 |
| 3,624,251 | 11/1971 | Huber | 260—112 X |
| 3,637,640 | 1/1972 | Huber | 260—112 X |
| 3,687,927 | 8/1972 | Huber | 260—112 X |

FOREIGN PATENTS

| 1,160,151 | 7/1969 | Great Britain. |

HOWARD E. SCHAIN, Primary Examiner

U.S. Cl. X.R.

424—117; 260—112 R